United States Patent
Teeter

(10) Patent No.: US 9,247,318 B2
(45) Date of Patent: Jan. 26, 2016

(54) IHS ACCESSIBLE RACK SECURING SYSTEM

(71) Applicant: Dell Products L.P., Round Rock, TX (US)

(72) Inventor: Victor B. Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 299 days.

(21) Appl. No.: 13/843,280

(22) Filed: Mar. 15, 2013

(65) Prior Publication Data

US 2014/0268514 A1 Sep. 18, 2014

(51) Int. Cl.
*H05K 5/02* (2006.01)
*H04Q 1/02* (2006.01)

(52) U.S. Cl.
CPC ............. *H04Q 1/09* (2013.01); *Y10T 29/49826* (2015.01)

(58) Field of Classification Search
CPC ............. H04Q 1/00; H04Q 1/04; H04Q 1/12; H04Q 1/023; H04Q 1/025; H04Q 1/062; H05K 5/02; H05K 13/00; H05K 7/18
USPC .............. 361/679, 724, 679.01, 726; 211/182
See application file for complete search history.

(56) References Cited

U.S. PATENT DOCUMENTS

| | | | | |
|---|---|---|---|---|
| 5,103,659 A | * | 4/1992 | Benefield, Sr. | 70/94 |
| 5,209,356 A | * | 5/1993 | Chaffee | 211/26 |
| 5,797,487 A | * | 8/1998 | Young | 206/308.2 |
| 6,921,990 B1 | * | 7/2005 | Higgins | 307/328 |
| 7,850,013 B1 | * | 12/2010 | Kramer et al. | 211/4 |
| 2003/0233855 A1 | * | 12/2003 | Pirveysian | E05B 65/467 70/62 |
| 2011/0203335 A1 | * | 8/2011 | DeWalch et al. | 70/158 |

OTHER PUBLICATIONS

STIC Search.*

* cited by examiner

*Primary Examiner* — Dion R Ferguson
*Assistant Examiner* — Mandeep Buttar
(74) *Attorney, Agent, or Firm* — Haynes and Boone, LLP

(57) ABSTRACT

A rack securing system includes a rack having a plurality of posts that are oriented to house a plurality of device chassis. Each of the plurality of posts includes a plurality of post apertures that are operable to receive a fastener to couple an edge of a device chassis to the rack. A first securing member includes that includes a plurality of first securing member apertures is operable to be oriented adjacent a first post such that the plurality of first securing member apertures align with respective post apertures on the first post and the first securing member extends over at least one fastener that is coupling an edge of a device chassis to the rack. At least two locking devices are operable to extend through respective aligned first securing member apertures and post apertures to secure the first securing member to the first post.

17 Claims, 15 Drawing Sheets

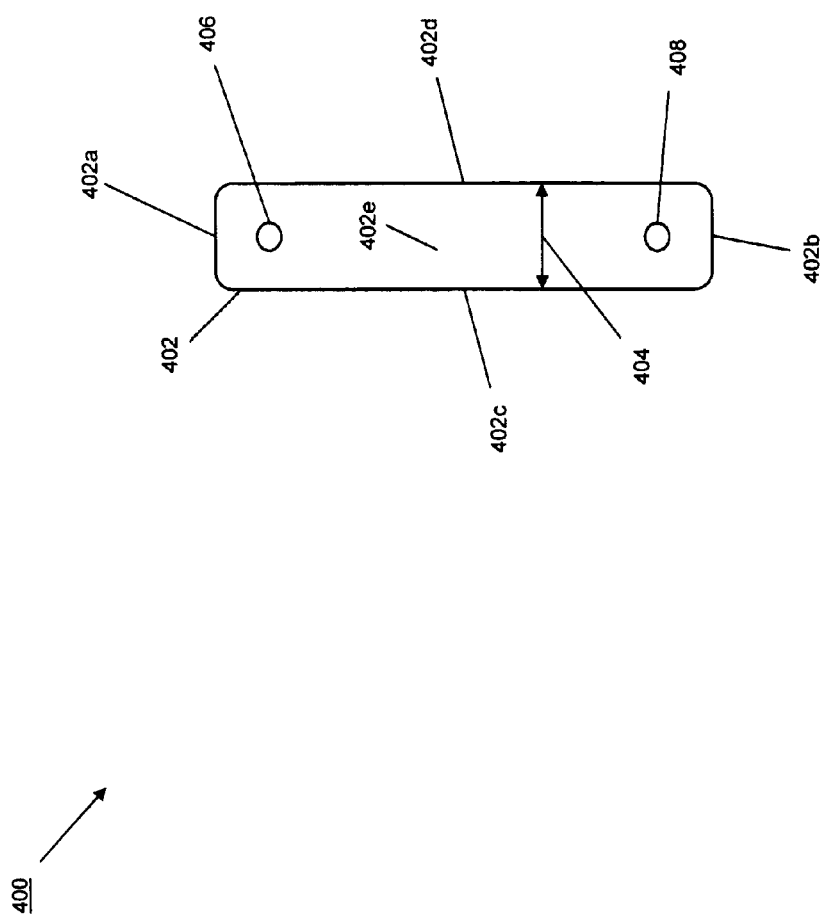

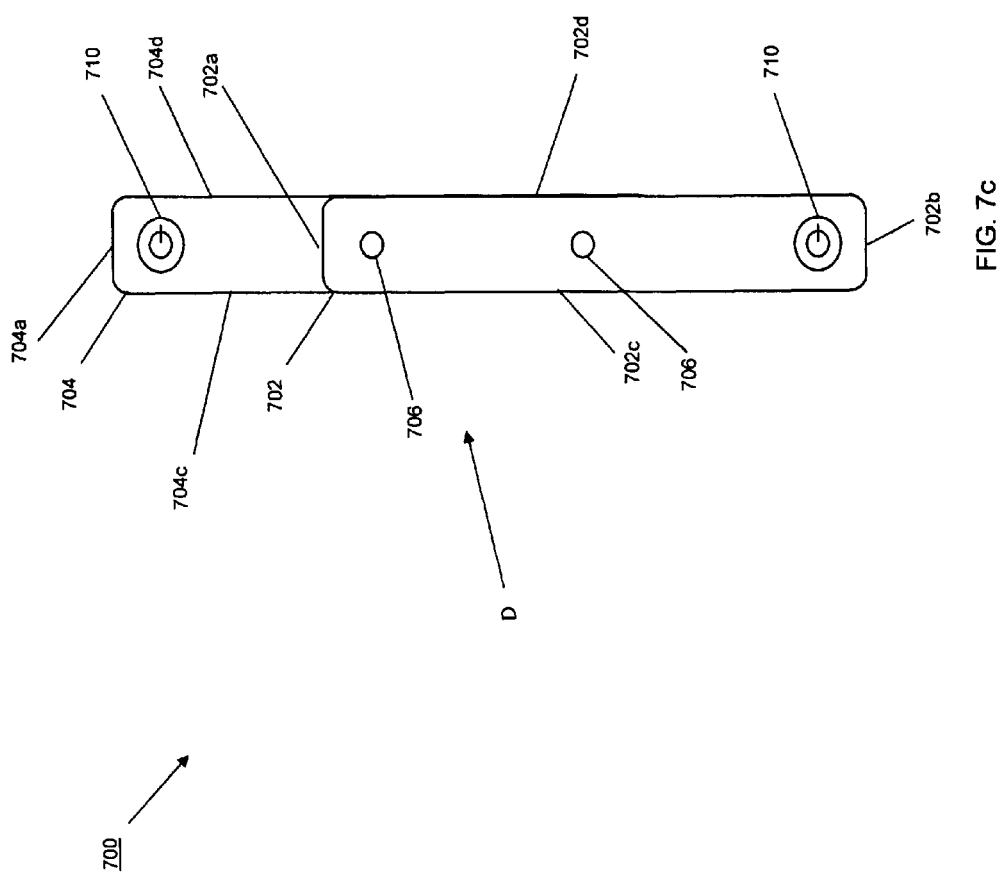

IHS ACCESSIBLE RACK SECURING SYSTEM

BACKGROUND

The present disclosure relates generally to information handling systems, and more particularly to system for allowing access to an information handling system while securing that information handling system in a rack.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some IHS environments such as, for example, computing centers, IHSs are stored in racks that are operable to house a plurality of the IHSs. For example, server IHSs, storage IHSs, switch IHSs, and/or a variety of other IHSs known in the art may be stacked vertically relative to each other in a 2-post or 4-post rack by fastening the IHSs to the posts on the rack using industry standard screws and nuts. Those industry standard screws are removable using a standard Phillips screwdriver, which provides for easy coupling and decoupling of the IHSs from the rack, but also raises issues with regard to theft. Conventional racks have been provided to secure the IHSs in the rack by including a lockable door on the rack that closes over all of the IHSs coupled to the rack such that when the door is locked, none the IHSs may be removed from the rack. However, some IHSs in the rack may need to be accessed often, and the need to unlock the rack door each time that access is needed typically results in users either not locking the door to the rack, or removing that door altogether. Conventional rack-mounted server and storage IHSs have also been provided with lockable bezels that cover the entire face of the IHS such that the storage devices (which are accessible on the face of the server or storage IHS) may not be removed. However, there are often features on the face of the IHSs that need to be accessed regularly, and this need for regular access can result in users neglecting to lock the lockable bezel or removing that lockable bezel altogether.

Accordingly, it would be desirable to provide an improved rack securing system.

SUMMARY

According to one embodiment, a rack securing system includes a rack having a plurality of posts, wherein the plurality of posts are oriented to house a plurality of device chassis, and wherein each of the plurality of posts includes a plurality of post apertures that are operable to receive a fastener to couple an edge of a device chassis to the rack; an elongated first securing member including a plurality of first securing member apertures; and at least two locking devices, wherein the first securing member is operable to be oriented adjacent a first post of the plurality of posts such that the plurality of first securing member apertures align with respective post apertures on the first post and the first securing member extends over at least one fastener that is coupling an edge of a device chassis to the rack, and wherein each of the at least two locking devices is operable to extend through a respective one of the plurality of aligned first securing member apertures and post apertures to secure the first securing member to the first post.

BRIEF DESCRIPTION OF THE DRAWINGS

FIG. 4a is a front view illustrating an embodiment of a securing member.

FIG. 4b is a side view illustrating an embodiment of the securing member of FIG. 4a.

FIG. 7c is a front view illustrating an embodiment of the adjustable length securing member of FIGS. 7a and 7b with its length adjusted.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
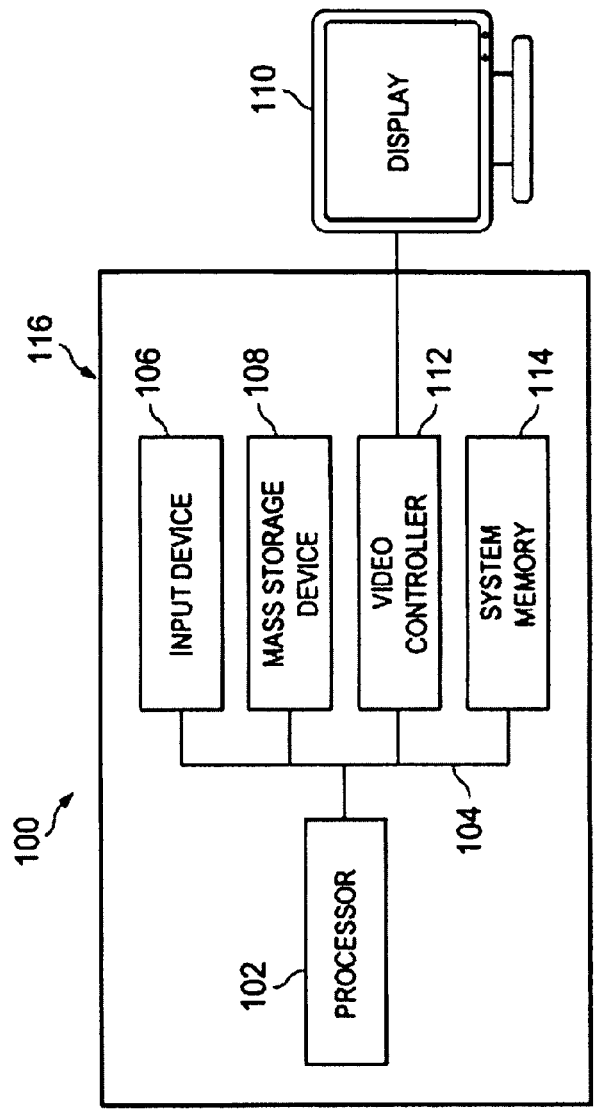
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
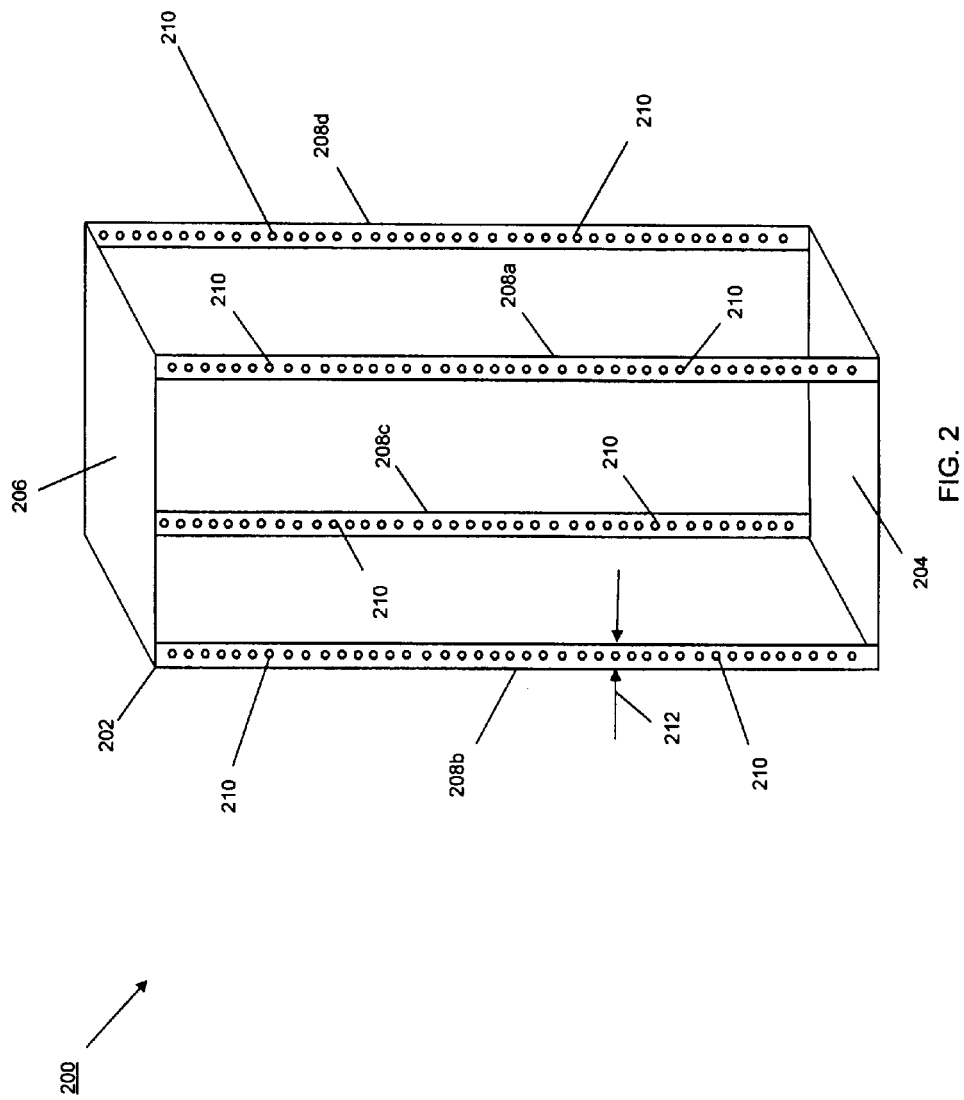
FIG. 2 is a perspective view illustrating an embodiment of an IHS rack.

Referring now to FIG. 2, an embodiment of an information handling system (IHS) rack 200 is illustrated. The IHS rack 200 includes a frame 202 having a bottom section 204 separated from a top section 206 by a plurality of posts 208a, 208b, 208c, and 208d. Each of the plurality of posts 208a, 208b, 208c, and 208d defines a plurality of apertures 210 that are operable to couple IHS chassis to the IHS rack 200. In an embodiment, each of the posts 208a, 208b, 208c, and 208d includes a thickness 212, discussed in further detail below. While the IHS rack 200 of the illustrated embodiment is described herein as a 4 post IHS rack, one of skill in the art will recognize that the teachings of the present disclosure apply equally to a 2-post rack, or to the use of only two of the posts in the 4-post rack. Furthermore, several conventional features on the IHS rack 200 have been omitted for clarity of illustration and discussion, but one of skill in the art will recognize that the IHS rack 200 may include support channels (for coupling IHS chassis to the IHS rack and for moving the IHS chassis relative to the IHS rack), support surfaces, cable management components, and/or a variety of other IHS rack features known in the art.

Figure 3:
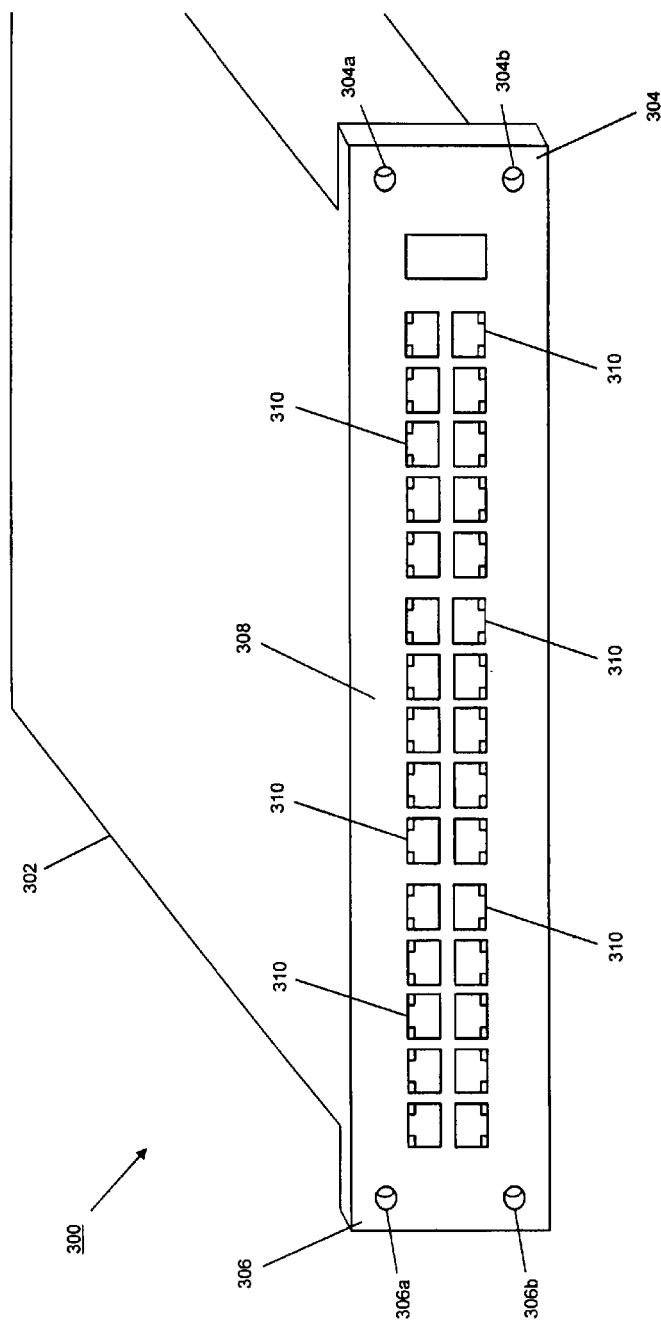
FIG. 3 is a perspective view illustrating an embodiment of a switch IHS.

Referring now to FIG. 3, an embodiment of an IHS 300 is illustrated. The IHS 300 may be the IHS 100, discussed above with reference to FIG. 1, and/or may include some or all of the components of the IHS 100. In the illustrated embodiments below, the IHS 300 is a switch IHS, but in other embodiments, the IHS 300 may be a server IHS, a storage IHS, and/or a variety of other IHSs known in the art. The IHS 300 includes an IHS chassis 302 that houses the components of the IHS 300. A plurality of front edge portions 304 and 306 extend from the IHS chassis 302, and a front surface 308 of the IHS chassis 302 extends along the IHS chassis 302 and the front edge portions 304 and 306. The front edge portion 304 defines a plurality of IHS chassis apertures 304a and 304b that extend through the front edge portion 304 from the front surface 308, and the front edge portion 306 defines a plurality of IHS chassis apertures 306a and 306b that extend through the front edge portion 306 from the front surface 308. The IHS chassis 302 includes a plurality of connectors 310 that are located on the front surface 308 and that connect to components in the IHS 300 that are not illustrated for clarity of discussion.

Figure 4B:
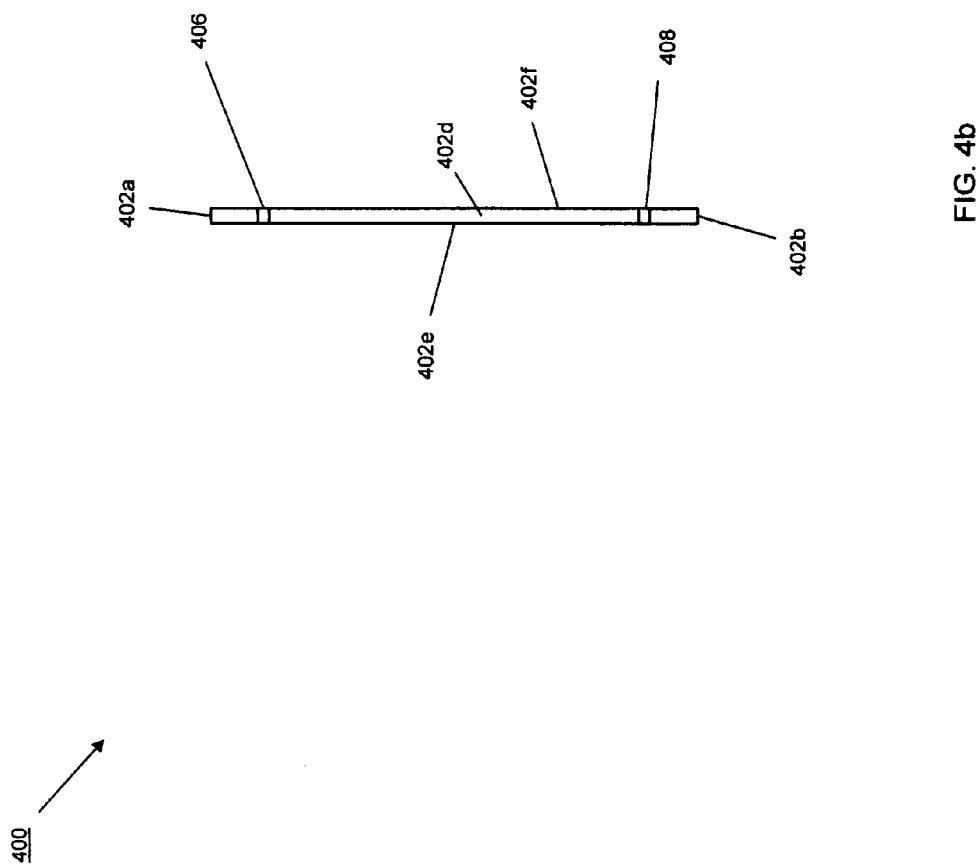

Referring now to FIGS. 4a and 4b, an embodiment of an elongated securing member 400 is illustrated. The securing member 400 includes an elongated base 402 having a top edge 402a, a bottom edge 402b located opposite the base 402 from the top edge 402a, and a plurality of side edges 402c and 402d on opposite sides of the base 402 and extending between the top edge 402a and the bottom edge 402b. A front surface 402e extends between the top edge 402a, the bottom edge 402b, and the side edges 402c and 402d. A rear surface 402f is located opposite the base 402 from the front surface 402e and extends between the top edge 402a, the bottom edge 402b, and the side edges 402c and 402d. In an embodiment, the securing member 400 may be fabricated from a high strength material such as, for example, a metal material (e.g., steel), carbon fiber, a high strength plastic, and/or a variety of other high strength materials known in the art. Furthermore, the thickness 404 of the securing member 400, e.g., the distance between the side edges 402c and 402d, may be selected by considering the thickness 212 of a post (e.g., 208a, 208b, 208c, and/or 208d) on the frame 202 of the IHS rack 200 and/or the position of accessible features on the IHS 300 when coupled to the IHS rack 200. As discussed in further detail below, the dimensions of the securing member 400 are selected such that the securing member 400 prevents fasteners that couple IHSs 300 to the IHS rack 200 from being disengaged the from the IHS 300 and IHS rack 200, while also ensuring that features such as connectors, displays, input devices, and/or other IHS features known in the art are not obstructed and are accessible by a user. A pair of securing member apertures 406 and 408 extends through the base 402 from the front surface 402e to the rear surface 402f.

Referring now to FIGS. 2, 3, 5a, and 5b, an embodiment of a method 500 for securing an IHS to a rack is illustrated. The method 500 begins at block 502 where IHSs are positioned in a rack. In an embodiment, the IHS 300 illustrated in FIG. 3 may be positioned in the IHS rack 200 by positioning the IHS 300 between the posts 208a, 208b, 208c, and 208d such that the IHS chassis apertures 304a and 304b on the front edge portion 304 are aligned with apertures 210 on the post 208a and the IHS chassis apertures 306a and 306b on the front edge portion 306 are aligned with apertures 210 on the post 208b. As discussed above, the frame 202 of the IHS rack 200 may include channels, slides, supports and/or other coupling mechanisms that allow IHSs to be positioned in the IHS rack 200 such that IHS chassis apertures 304a, 304b, 306a, and 306b on the IHS 300 align with apertures 210 defined by the posts on the IHS rack 200.

Figure 5A:
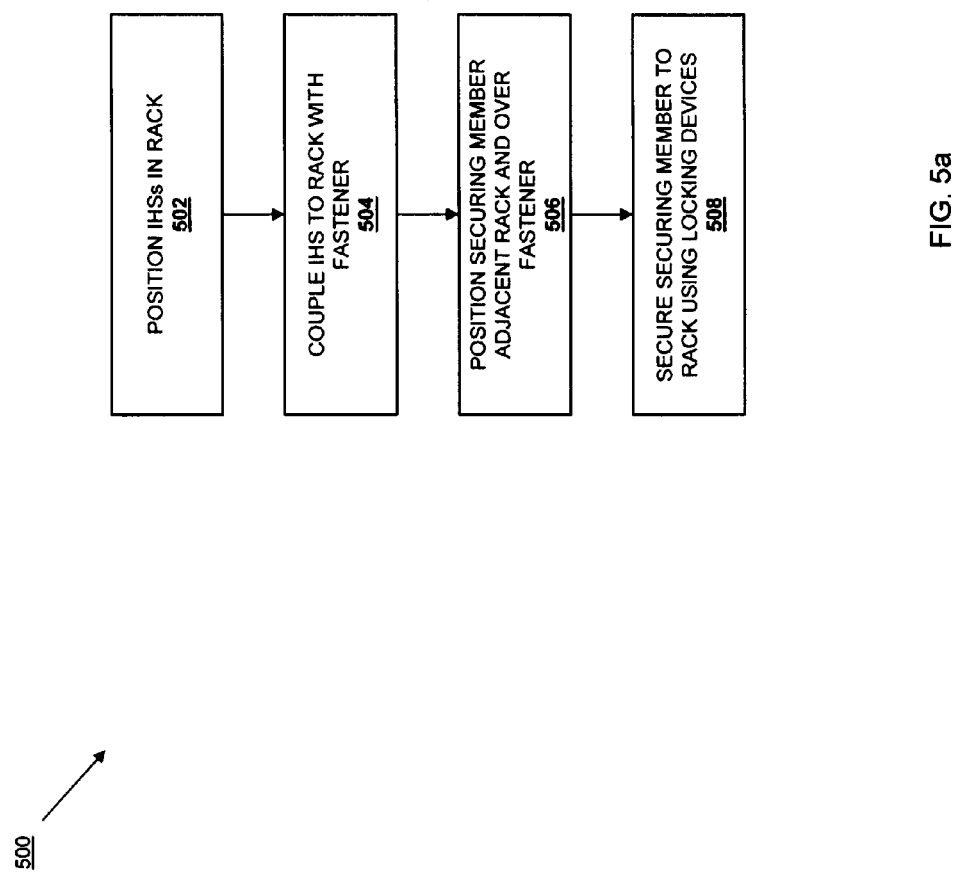
FIG. 5a is a flow chart illustrating an embodiment of a method for securing an IHS in an IHS rack.
Figure 5B:
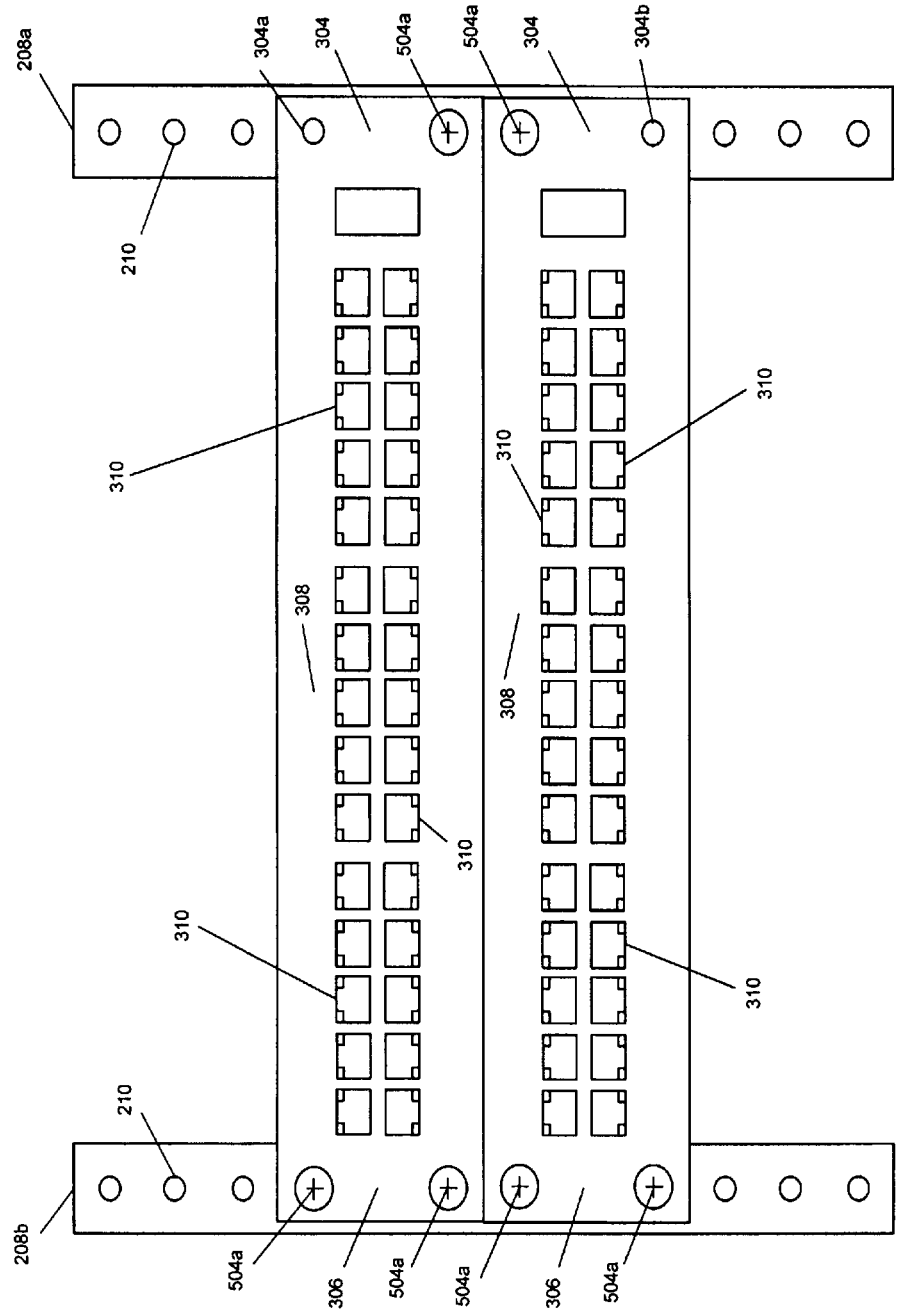
FIG. 5b is a front view illustrating an embodiment of a plurality of IHSs coupled to an IHS rack.

The method 500 then proceeds to block 504 where the IHS is coupled to the IHS rack. In an embodiment, any IHS 300 positioned in the IHS rack 200 at block 502 of the method 500 may be coupled to the IHS rack 200 by positioning fasteners in the aligned IHS chassis apertures 304a, 304b, 306a, and 306b and rack/post apertures 210. FIG. 5 illustrates a plurality of IHSs 300 positioned in the IHS rack 200, with the IHS chassis apertures 304a and 304b aligned with respective apertures 210 on the post 208a, and the IHS chassis apertures 306a and 306b aligned with respective apertures 210 on the post 208b. Furthermore, each of the IHSs 300 has been coupled to the IHS rack 200 using fasteners 504a. Specifically, a fastener 504a has been positioned in each of the IHS chassis apertures 306a and 306b on the front edge portion 306 of each IHS 300 such that those fasteners 504a extend through respective aligned apertures on the post 208b, and a respective fastener nut 504b (illustrated in FIG. 5d) has been engaged with each fastener 504a to couple the front edge portion 306 of each IHS 300 to the post 208b. Furthermore, as can be seen in FIG. 5b, fasteners 504a have also been positioned in the IHS chassis aperture 304a on the front edge portion 204 of one of the IHSs 300, and in the IHS chassis aperture 304b on the front edge portion 304 of the other of the IHSs 300 such that those fasteners 504a extend through respective aligned apertures on the post 208a, and a respective fastener nut 504b (illustrated in FIG. 5d) has been engaged with each fastener 504a to couple the front edge portion 304 of each IHS 300 to the post 208a. As discussed in further detail below, the IHS chassis aperture 304a on the front edge portion 204 of one of the IHSs 300, and in the IHS chassis aperture 304b on the front edge portion 304 on the other of the IHSs 300 are left free of fasteners 504a such that the securing member 400 may be secured to the post 208a at block 708 of the method 700. In an embodiment, each fastener/fastener nut combination may be industry standard screw/nut combinations that include, for example, 10-32 rack screws with 10-32 threaded nuts (e.g., used with racks available from Dell, Inc.), 12-24 rack screws with 12-24 threaded nuts, M6 rack screws with M6 threaded nuts (e.g., used with racks available from Hewlett Packard, Inc.), and/or another fastener/fastener nut combination operable to be positioned in an industry standard rack aperture (e.g., a ⅜" rack aperture.)

Figure 5C:
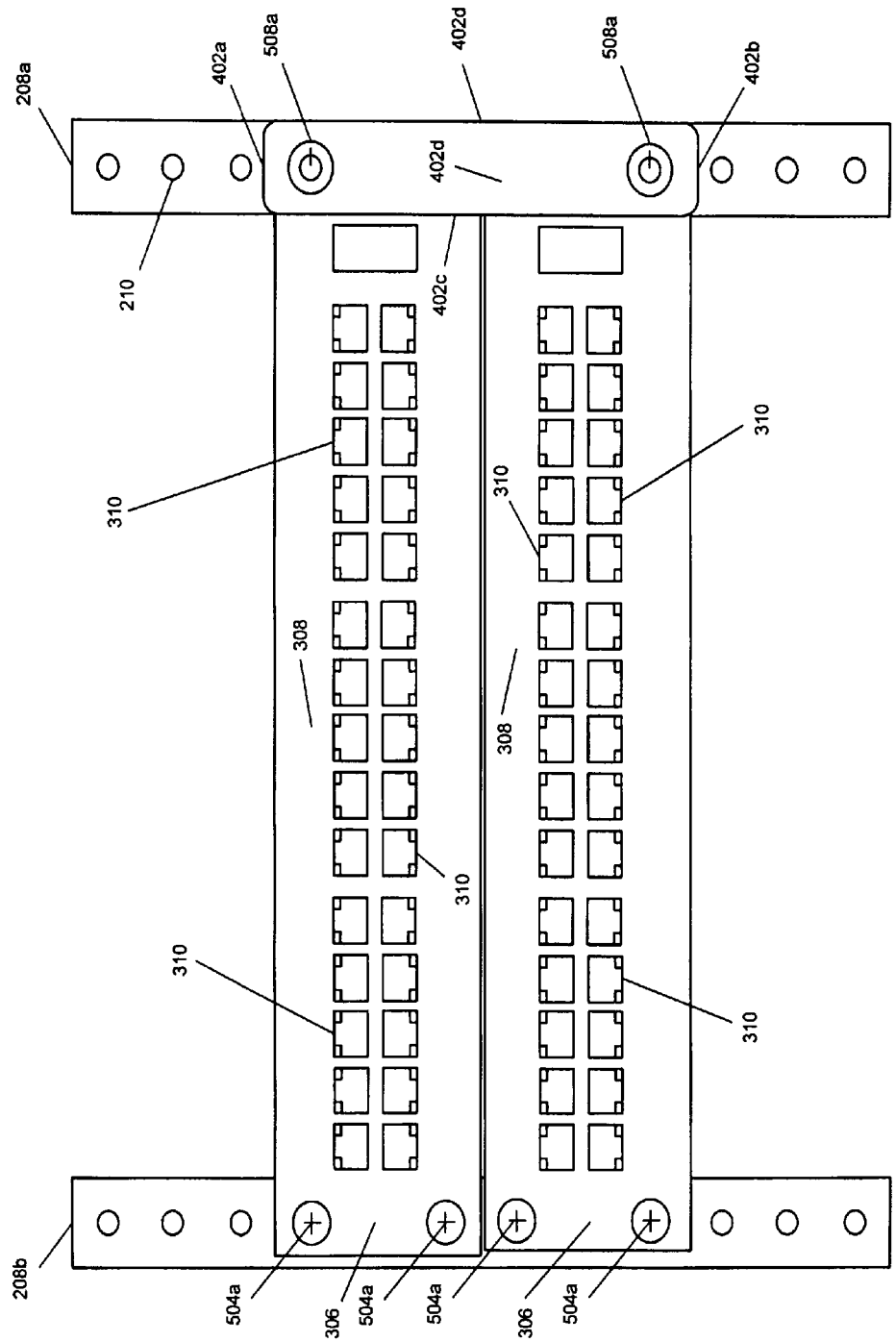
FIG. 5c is a front view illustrating an embodiment of a plurality of IHSs secured to an IHS rack with a securing member.
Figure 5D:
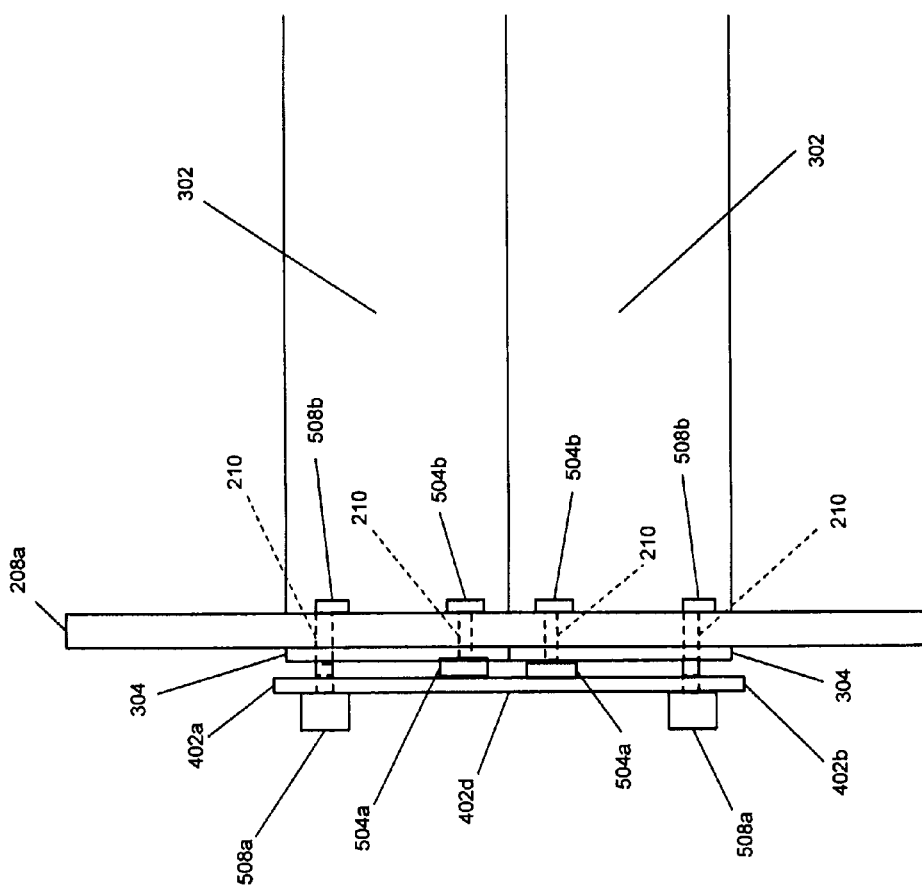
FIG. 5d is a side view illustrating an embodiment of a plurality of IHSs secured to an IHS rack with a securing member.

Referring now to FIGS. 2, 3, 5a, 5c, and 5d, the method 500 then proceeds to block 506 where a securing member is positioned adjacent the IHS rack and over fasteners that are coupling an IHS to the IHS rack. As can be seen in FIGS. 5c and 5d, the securing member 400 may be positioned adjacent the post 208a on the IHS rack 200 such that the securing member aperture 406 on the securing member 400 is aligned with the IHS chassis aperture 304a and respective aperture 210 on the post 208a that are free of a fastener 504a, and the securing member aperture 408 on the securing member 400 is aligned with the IHS chassis aperture 304b and respective aperture 210 on the post 208a that are free of a fastener 504a. With the securing member 400 positioned in this manner, the securing member 400 extends over the fasteners 504a that are coupling the IHSs 300 to the post 208a on the IHS rack 200.

The method 500 then proceeds to block 508 where the securing member is secured to the IHS rack using locking devices. In an embodiment, a pair of locking devices 508a are used to secure the securing member 400 to the IHS rack 200 such that the IHSs 300 are secured to the IHS rack 200. Specifically, a locking device 508a is positioned in the securing member aperture 406, the IHS chassis aperture 304a, and the aperture 210 on the post 208a, while another locking device 508a is positioned in the securing member aperture 408, the IHS chassis aperture 304b, and the aperture 210 on the post 208a, as illustrated in FIGS. 5c and 5d. The locking devices 508a may then be locked to the post 208a on the IHS rack 200 by, for example, using a key to actuate a locking portion 508b of the locking devices 508a to engage the locking portion 508b with the rear surface of the post 208a such that the locking devices 508a cannot be removed from the securing member apertures 406/408, the IHS chassis apertures 304a/304b, and the apertures 210 on the post 208a. In an embodiment, the locking devices 508a may be Kensington type locking devices and/or any other locking device that may be positioned in the securing member apertures 406/408, the IHS chassis apertures 304a/304b, and the apertures 210 on the post 208a, and then locked such that it may not be removed.

With the securing member 400 secured to the post 208a as discussed above, the fasteners 504a that couple the IHSs 300 to the IHS rack 200 are not accessible, and thus the IHSs 300 may not be decoupled from the IHS rack 200 (due to the inability to access and remove those fasteners 504a from the IHS chassis apertures 304a/304b and the apertures 210 on the post 208a.) Furthermore, as can be seen from FIG. 5c, the thickness 404 of the securing member 400 has been selected such that the securing member 400 does not extend past the sides of the post 208a (e.g., the thickness 404 of the securing member 400 is less than or equal to the thickness 212 of the post 208a) and over any portion of the IHSs 300 to which access is needed so that it may secure the IHSs 300 to the IHS rack 200 without inhibiting access to desired portions of the IHS 300 (e.g., the connectors 310.) While the securing member 400 is illustrated as having a thickness that does not extend outside the thickness of the IHS rack/frame/post, in some embodiments the securing member 400 may extend beyond the thickness of the IHS rack/frame/post as long as the securing member 400 does not inhibit access to desired portions of the IHSs 300 such as connectors, storage devices, displays, etc. Thus, a securing member 400 is provided that secures the IHS 300 to the IHS rack 200 while not inhibiting access to desired portions of the front surface 308 of the IHS 300. Furthermore, in some embodiments, the securing member 400 may be sufficient to couple and secure the IHSs 300 to the IHS rack 200 such that fasteners 504a are not needed (e.g., the locking devices 508a may be used to both couple and secure each of the IHSs 300 to the IHS rack similarly as illustrated in FIG. 5c but without the use of the fasteners 504a; the securing member 400 may extend over an IHS 300 that is positioned in the IHS rack 200 but not coupled to the IHS rack 200 with fasteners 504a or a locking device 508a, and that securing member 400 will prevent that IHS 300 from being removed from the IHS rack 200 similarly as illustrated below in FIG. 6, i.e., if the two middle IHSs 300 in FIG. 6 were not coupled to the IHS rack 200 with fasteners 504a but rather just prevented from being removed from the IHS rack 200 by the securing device 600.)

Figure 5E:
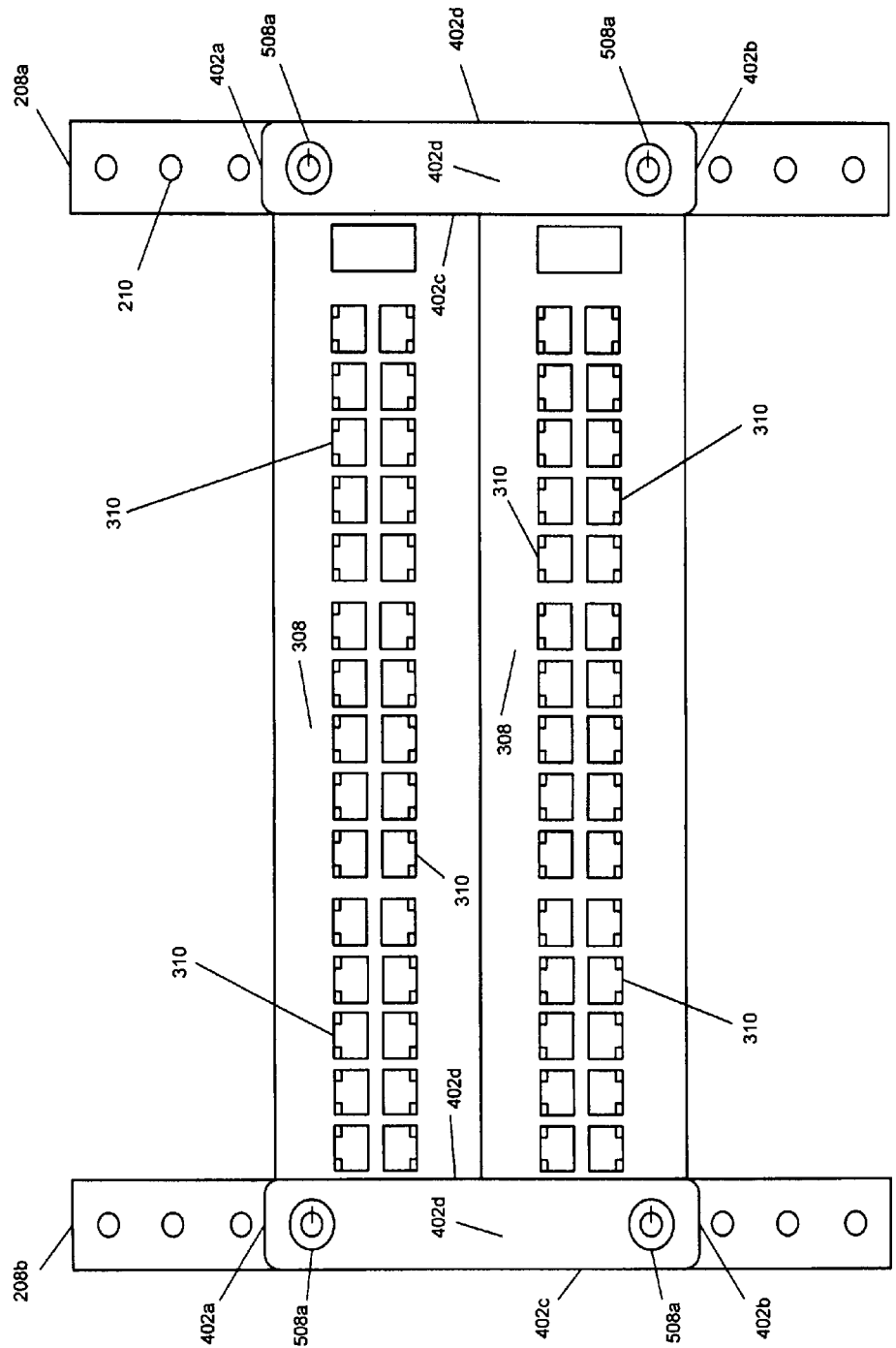
FIG. 5e is a front view illustrating an embodiment of a plurality of IHSs secured to an IHS rack with a pair of securing members.

In many embodiments, the use of a single securing member 400 as illustrated in FIG. 5c will prevent removal of the IHSs 300 from the IHS rack 200, thus providing sufficient security for those IHSs 300. However, in some situations additional security may be needed and/or desired. In such situations, additional securing members 400 may be secured over front edge portions 306 of the IHSs 300 and/or fasteners 504a that are coupling IHSs 300 to the IHS rack 200. For example, FIG. 5e illustrates a situation where the fasteners have not been positioned in the IHS chassis aperture 306a on one of the IHSs 300, or in the IHS chassis aperture 306b on the other of the IHSs 300, and instead another securing member 400 has been positioned adjacent the post 208b on IHS rack 200 such that the securing member aperture 406 on the securing member 400 is aligned with the IHS chassis aperture 306a and respective aperture 210 on the post 208b, and the securing member aperture 408 on the securing member 400 is aligned with the IHS chassis aperture 306b and respective aperture 210 on the post 208b. Similarly as discussed above, a locking device 508a is positioned in the securing member aperture 406, the IHS chassis aperture 306a, and the aperture 210 on the post 208b, while another locking device 508a is positioned in the securing member aperture 408, the IHS chassis aperture 306b, and the aperture 210 on the post 208b, and those locking devices 508a are locked to the IHS rack 200 such that the fasteners 504a coupling the IHSs 300 to the IHS rack 200 may not be removed from the post 208b and/or the IHSs 300 may not be removed from the IHS rack 200. As can be seen, each of the securing members 400 does not cover the connectors 310 of the IHS 300, so the additional security provided by adding securing members 400 does not include any IHS accessibility cost, raising the likelihood that users will employ such security measures and reducing the possibility of theft of the IHSs. While the attachment of securing members 400 to two of the posts 208a and 208b on the IHS rack 200 has been illustrated, securing members attached to additional posts (e.g., 208c and 208d) will fall within the scope of the present disclosure.

Figure 6:
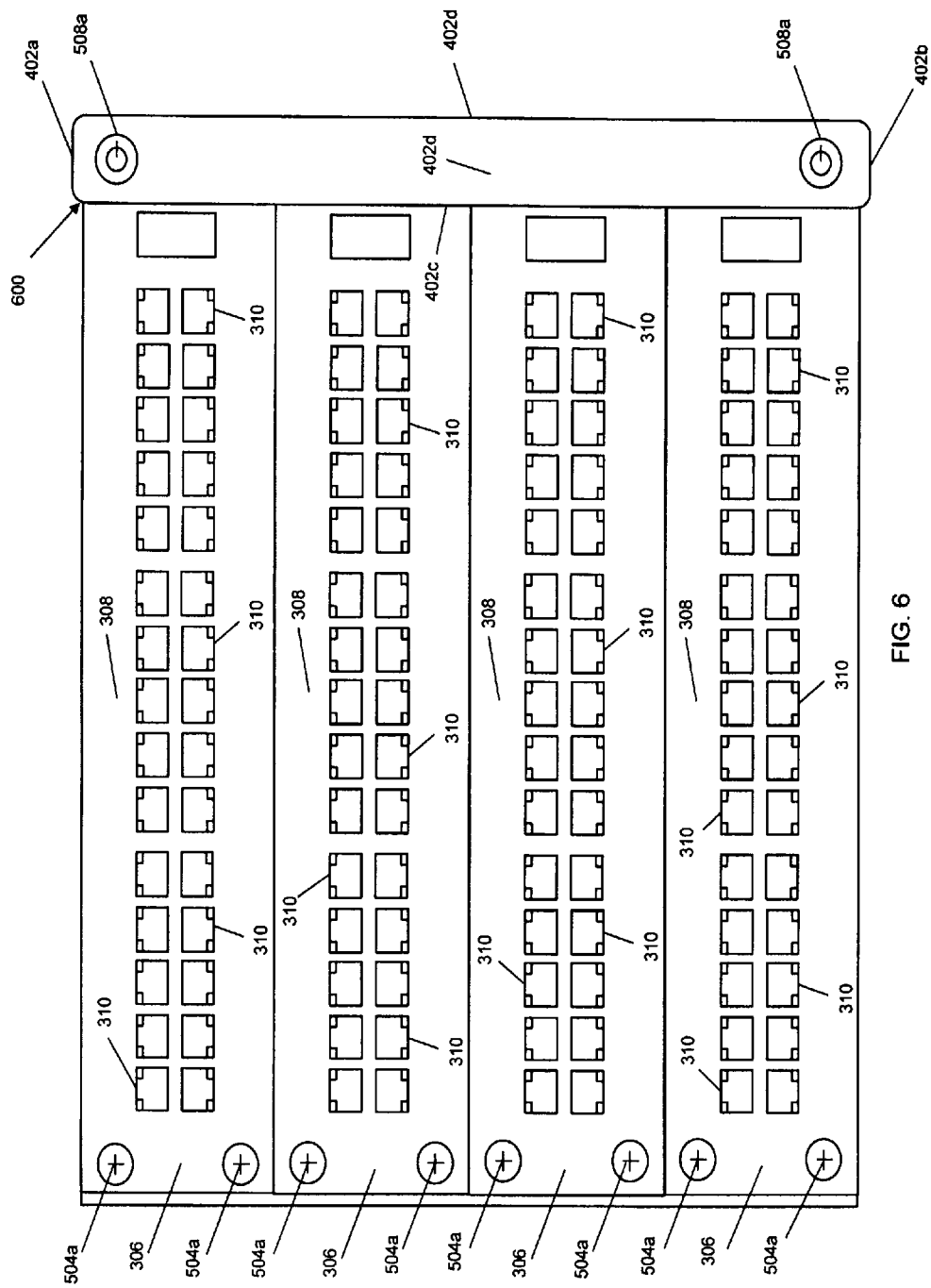
FIG. 6 is a front view illustrating an embodiment of a plurality of IHSs secured to an IHS rack with a securing member.

Furthermore, different securing members may be provided in order to allow for the securing of any number of IHSs 300 to the IHS rack 200. For example, FIG. 6 illustrates a securing member 600 that is substantially similar to the securing member 400, discussed above with reference to FIG. 4, but with the provision that the securing member 600 is longer as measured between the top edge 402a and the bottom edge 402b. Thus, as can be seen in FIG. 6, the securing member 600 may be secured to the IHS rack 200 in substantially the same manner as described above for the securing member 400 according to blocks 506 and 508 of the method 500, resulting the securing member 600 being positioned over fasteners 504a that couple multiple IHSs 300 to the IHS rack 200 (four in the illustrated embodiment.) Thus, depending on a number of IHSs 300 that are desired to be secured to the IHS rack 200, the length of the securing member (or securing members) may be selected such that the securing member and two locking devices 508a are sufficient to secure each of those IHSs 300 to the IHS rack 200.

Referring now to FIGS. 7a, 7b, 7c, and 7d, an embodiment of an adjustable length securing member 700 is illustrated. The securing member 700 includes a pair of securing member portions 702 and 704 that are moveable relative to each other along their longitudinal axis, but coupled together (the coupling mechanisms have not been illustrated for clarity of discussion and illustration) such that they are not easily separated. The securing member portion 702 includes a top edge 702a, a bottom edge 702b located opposite the top edge 702a, a plurality of sides edges 702c and 702d extending between the top edge 702a and the bottom edge 702b, a front surface 702e extending between the top edge 702a, the bottom edge 702b, and the side edges 702c and 702d, and a rear surface 702f located opposite the front surface 702e and extending between the top edge 702a, the bottom edge 702b, and the side edges 702c and 702d. The securing member portion 704 includes a top edge 704a, a bottom edge 704b located opposite the top edge 704a, a plurality of sides edges 704c and 704d extending between the top edge 704a and the bottom edge 704b, a front surface 704e extending between the top edge 704a, the bottom edge 704b, and the side edges 704c and 704d, and a rear surface 704f located opposite the front surface 74e and extending between the top edge 704a, the bottom edge 704b, and the side edges 704c and 704d. The securing member portion 702 defines a plurality of securing member apertures 706, and the securing member portion 704 defines a plurality of securing member apertures 708.

Figure 7A:
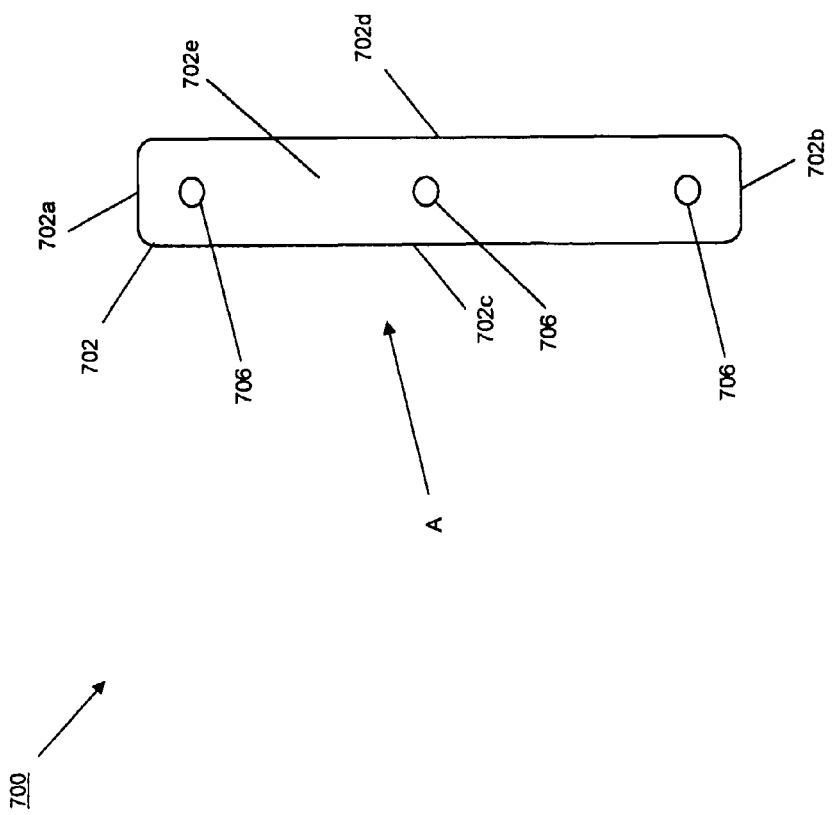
FIG. 7a is a front view illustrating an embodiment of an adjustable length securing member.
Figure 7B:
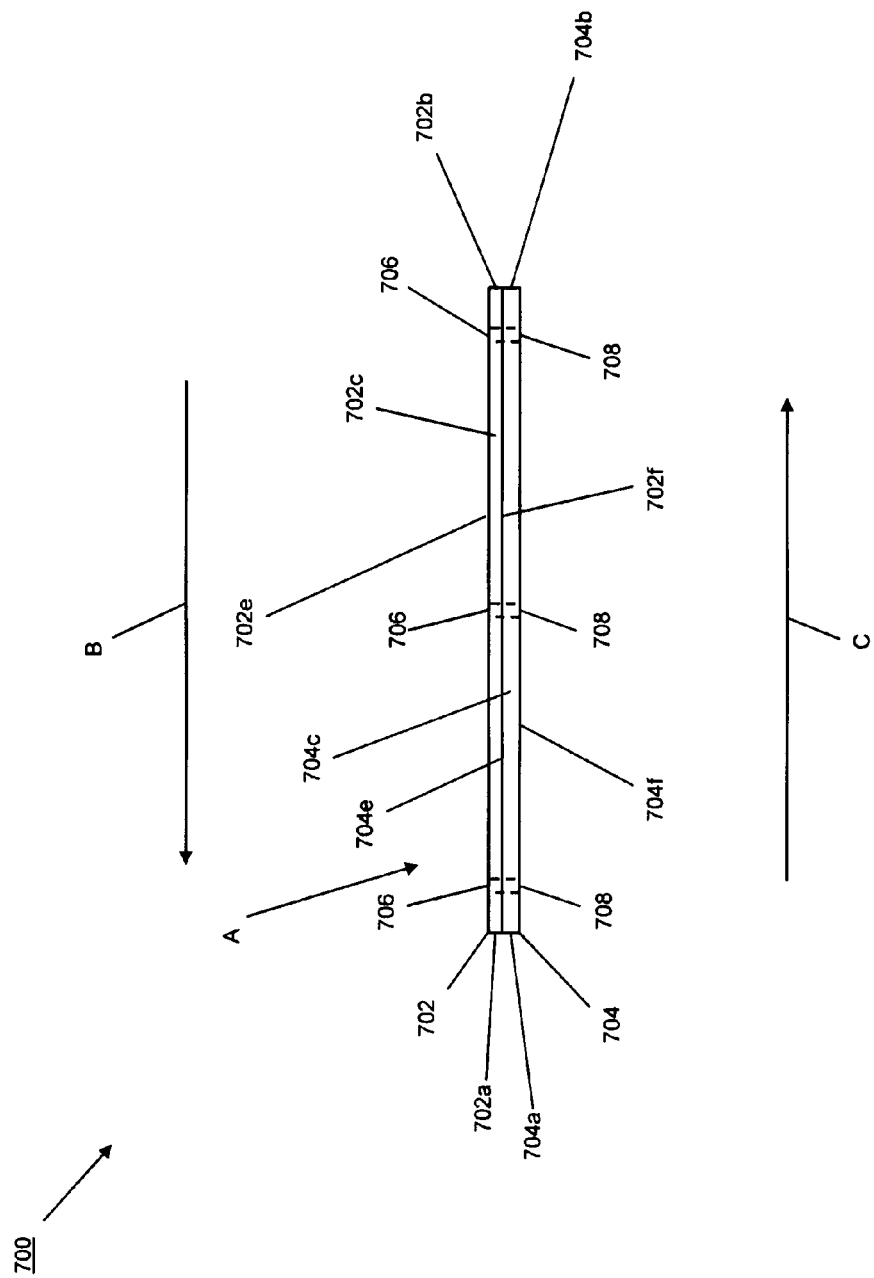
FIG. 7b is a side view illustrating an embodiment of an adjustable length securing member.

As can be seen in FIGS. 7a and 7b, the securing member portions 702 and 704 are moveably coupled together such that the securing member 700 may be provided in an orientation A in which each of the securing member apertures 706 on the securing member portion 702 align with the securing member apertures 708 on the securing member portion 704. As discussed above, the securing member portions 702 and 704 are coupled together such that the securing member portion 702 is not easily separate from the securing member portion 704 (e.g., either or both of the securing member portions 702 and 704 may include features that couple the securing member portions 702 and 704 together). However, the coupling of the securing member portions 702 and 704 is a moveable coupling that allows the securing member portion 702 to move relative to the securing member portion 704. For example, in the illustrated embodiment, the securing member portion 702 may be moved in a direction B while the securing member portion is moved in a direction C, and FIG. 7c illustrates how the securing member portions 702 and 704 of the illustrated embodiment slide relative to each other (while remaining coupled to each other) such that the length of the securing member 700 adjusts to a greater length.

FIG. 7c illustrates the securing member 700 in a first extended orientation D, where the securing member portion 702 has been moved in the direction B and the securing member portion 704 has been moved in the direction C such that two of the securing member apertures 706 on the securing member portion 702 are aligned with respective securing member apertures 708 on the securing member portion 704. In the embodiment illustrated in FIG. 7c, a pair of locking devices 710 have been positioned in securing member apertures 706 and 708 on opposite ends of the securing member 700 (e.g., on the distal ends of the securing member portion 702 and 704) to illustrate how the securing member 700 may be extended and then coupled to an IHS rack similarly as discussed above with reference to FIGS. 5c and 6. In the situation illustrated in FIG. 7c, the coupling of the securing member portions 702 to the securing member portion 704 is sufficient to ensure that when the securing member 700 is positioned over front edge portions 304 and/or 306 of the IHSs 300, or fasteners 504a that couple the IHSs 300 to the IHS rack 200, those securing member portions 702 and 704 will not be easily separated such that those fasteners 504a may be accessed and/or those IHSs 300 removed from the IHS rack 200.

Figure 7D:
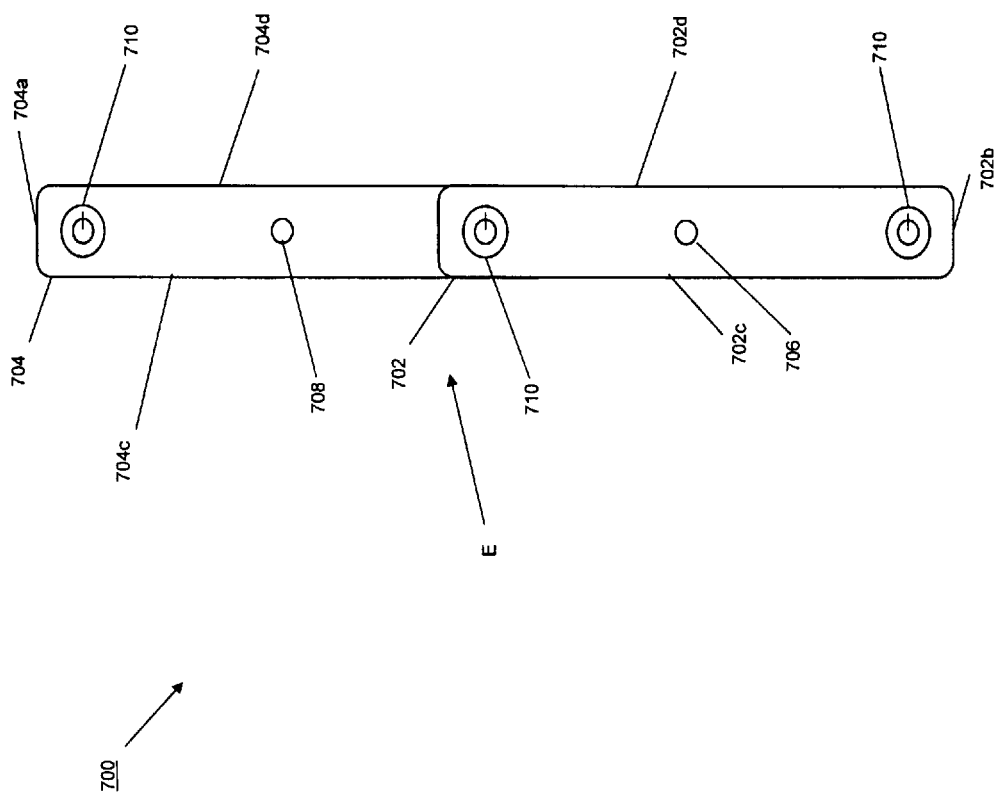
FIG. 7d is a front view illustrating an embodiment of the adjustable length securing member of FIG. 7c with its length adjusted.

FIG. 7d illustrates the securing member 700 in a second extended orientation E, where the securing member portion 702 has been moved further in the direction B and the securing member portion 704 has been moved further in the direction C (relative to the first extended orientation D) such that one of the securing member apertures 706 on the securing member portion 702 is aligned with a respective securing member aperture 708 on the securing member portion 704. In the embodiment illustrated in FIG. 7d, a pair of locking devices 710 have been positioned in the securing member apertures 706 and 708 on opposite ends of the securing member 700 (e.g., on the distal ends of the securing member portion 702 and 704), while a third locking member 710 has also been positioned in the aligned securing member apertures 706 and 708 in the middle of the securing member 700 to illustrate how the securing member 700 may be extended and then coupled to an IHS rack similarly as discussed above with reference to FIGS. 5c and 6. In the situation illustrated in FIG. 7d, the third locking member 710 is positioned in the aligned securing member apertures 706 and 708 in the middle of the securing member 700 to structurally reinforce the securing member 700 and ensure that the securing member 700 will remain positioned over fasteners 504a that couple the IHSs 300 to the IHS rack 200.

Thus, systems and methods have been described that provide for the securing of IHSs to an IHS rack using a securing member that does not inhibit user access to portions of the IHS. For example, when secured to the IHS rack, the securing member may extend along a post of the IHS rack and only over front edge portions of the IHSs (and in some cases over the fasteners that couple the IHSs to the IHS rack such that those fasteners are inaccessible) allowing full access to the IHSs (e.g., connectors on the face of the IHS) while ensuring that the IHSs cannot be easily removed from the IHS rack. The systems and methods of the present disclosure encourage IHS security by allowing full access and use of the IHSs in the IHS rack when those IHSs are secured to the IHS rack, which provides benefits over conventional systems that inhibit access to the IHSs when securing them and result in users not utilizing that security. Securing members may differ in length depending on the number of IHSs to be secured to the IHS rack, or may have adjustable lengths that allow them to extend over a varying number of IHSs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rack securing system, comprising:
   a rack including a plurality of posts, wherein the plurality of posts are oriented to house a plurality of device chassis, and wherein each of the plurality of posts includes a plurality of post apertures that are configured to receive a fastener to couple an edge of a device chassis to the rack;
   an elongated first securing member including a plurality of first securing member apertures, wherein the first securing member is configured to be oriented adjacent a first post of the plurality of posts such that the plurality of first securing member apertures align with respective post apertures on the first post and the first securing member extends over at least one fastener that is coupling an edge of a device chassis to the rack; and
   at least two locking devices, wherein each of the at least two locking devices is configured to extend through a respective one of the plurality of aligned first securing member apertures and post apertures to secure the first securing member to the first post, and wherein the first securing member does not extend past opposite sides of the first post when secured to the first post.

2. The system of claim 1, further comprising:
   an elongated second securing member including a plurality of second securing member apertures, wherein the second securing member is configured to be oriented adjacent a second post of the plurality of posts such that the plurality of second securing member apertures align with respective post apertures on the second post and the second securing member extends over at least one fastener that is coupling an edge of a device chassis to the rack, and wherein each of the at least two locking devices is configured to extend through a respective one of the plurality of aligned second securing member apertures and post apertures to secure the second securing member to the second post.

3. The system of claim 1, wherein the first securing member includes an adjustable length.

4. The system of claim 3, wherein the first securing member includes a first portion that is movable relative to a second portion to provide the adjustable length.

5. The system of claim 1, each of the at least two locking devices is configured to engage a surface of the first post to prevent removal from the respective one of the plurality of aligned first securing member apertures and post apertures.

6. An information handling system (IHS) security system, comprising:

an IHS rack including a frame defining an IHS chassis housing and including a first plurality of vertically oriented rack apertures in a first frame post;
an IHS chassis housed in the frame;
at least one first fastener engaging the IHS chassis and located in the first plurality of rack apertures to couple a first edge of the IHS chassis to the IHS rack;
an elongated first securing member including a plurality of first securing member apertures, wherein the first securing member is oriented such that the plurality of first securing member apertures align with respective first plurality of rack apertures on the frame and the first securing member extends over the at least one first fastener that is coupling the first edge of IHS chassis to the IHS rack; and
at least two locking devices, wherein the at least two locking devices include locking devices extending through a respective one of the plurality of aligned first securing member apertures and first plurality of rack apertures to secure the first securing member to the frame and wherein the first securing member does not extend past opposite edges the first frame post.

7. The IHS security system of claim 6, wherein the frame defines a second plurality of vertically oriented rack apertures in a second frame post that are located opposite the IHS chassis from the first plurality of rack apertures in the first frame post, and wherein the system further comprises:
   at least one second fastener engaging the IHS chassis and located in the second plurality of rack apertures to couple a second edge of the IHS chassis to the IHS rack; and
   an elongated second securing member including a plurality of second securing member apertures, wherein the second securing member is oriented such that the plurality of second securing member apertures align with respective second plurality of rack apertures on the frame and the second securing member extends over at least one second fastener that is coupling the second edge of the IHS chassis to the IHS rack, and wherein the at least two locking devices include locking devices extending through a respective one of the plurality of aligned first securing member apertures and second plurality of rack apertures to secure the second securing member to the frame.

8. The IHS security system of claim 6, wherein the first securing member includes an adjustable length.

9. The IHS security system of claim 8, wherein the first securing member includes a first portion that is movable relative to a second portion to provide the adjustable length.

10. The IHS security system of claim 6, the at least two locking devices are configured to engage a surface of the frame to prevent removal from the respective one of the plurality of aligned first securing member apertures and first rack apertures.

11. The IHS security system of claim 6, further comprising:
    a second IHS chassis having a second IHS edge coupled to the IHS rack by at least one second fastener, wherein the first securing member extends over the at least one second fastener when secured to the IHS rack by the at least locking devices.

12. A method for securing an IHS to a rack, comprising:
    positioning an IHS chassis in an IHS rack;
    coupling a first edge of the IHS chassis to the IHS rack by engaging the first edge of the IHS chassis with a first fastener that extends through a first rack aperture located on a first post in the IHS rack;

positioning a first securing member adjacent the IHS rack such that the first securing member extends over the first fastener, and a plurality of first securing member apertures on the first securing member are located adjacent respective second rack apertures that are located on the first post in the IHS rack and vertically oriented relative to the first rack aperture; and securing a locking device in each of the plurality of first securing member apertures and the respective second rack apertures to secure the first securing member to the IHS rack, wherein the first securing member does not extend past opposite edges of the first post in the IHS rack.

13. The method of claim 12, further comprising:
coupling a second edge of the IHS chassis to the IHS rack by engaging the second edge of the IHS chassis with a second fastener that extends through a third rack aperture located on a second port in the IHS rack that is opposite the IHS rack from the first rack aperture;

positioning a second securing member adjacent the IHS rack such that the second securing member extends over the second fastener and a plurality of second securing member apertures on the second securing member are located adjacent respective fourth rack apertures that are located on the second post in the IHS rack and vertically oriented relative to the third rack aperture; and securing a locking device in each of the plurality of second securing member apertures and the respective fourth rack apertures to secure the second securing member to the IHS rack.

14. The method of claim 12, further comprising:
adjusting the length of the first securing member.

15. The method of claim 14, further comprising:
moving a first portion of the first securing member relative to a second portion of the first securing member to adjust the length.

16. The method of claim 12, wherein the locking devices are configured to engage a surface of the IHS rack to prevent removal from the respective one of the plurality of aligned first securing member apertures and first rack apertures.

17. The method of claim 12, further comprising:
coupling a second IHS chassis to the IHS rack using a second fastener, wherein the first securing member extends over the second fastener.

* * * * *